(12) United States Patent
Fujita et al.

(10) Patent No.: US 10,132,624 B2
(45) Date of Patent: Nov. 20, 2018

(54) NORMAL DETECTION METHOD, NORMAL DETECTION DEVICE, AND MACHINING MACHINE PROVIDED WITH NORMAL DETECTION FUNCTION

(75) Inventors: Yoshihito Fujita, Tokyo (JP); Mikio Nakamura, Tokyo (JP); Hirofumi Ienaga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 982 days.

(21) Appl. No.: 14/375,693

(22) PCT Filed: Feb. 28, 2012

(86) PCT No.: PCT/JP2012/054853
§ 371 (c)(1),
(2), (4) Date: Sep. 29, 2014

(87) PCT Pub. No.: WO2013/121595
PCT Pub. Date: Aug. 22, 2013

(65) Prior Publication Data
US 2015/0019164 A1 Jan. 15, 2015

(30) Foreign Application Priority Data
Feb. 15, 2012 (JP) .................................. 2012-030413

(51) Int. Cl.
*G01B 5/02* (2006.01)
*G01B 21/16* (2006.01)
(Continued)

(52) U.S. Cl.
CPC ............. *G01B 21/16* (2013.01); *G01B 21/04* (2013.01); *G01B 21/22* (2013.01)

(58) Field of Classification Search
CPC ......... G01B 21/16; G01B 21/04; G01B 21/22
(Continued)

(56) References Cited

U.S. PATENT DOCUMENTS

| 5,182,714 A | 1/1993 | Matsuura |
| 5,327,351 A | 7/1994 | Matsuura et al. |
| 2007/0023122 A1* | 2/2007 | Moriguchi ............ G01M 17/02 156/64 |

FOREIGN PATENT DOCUMENTS

| JP | 61-269002 A | 11/1986 |
| JP | 3-3760 A | 1/1991 |

(Continued)

OTHER PUBLICATIONS

International Search Report and Written Opinion of the International Searching Authority dated May 29, 2012 for International Application No. PCT/JP2012/054853 with English Translation.
(Continued)

*Primary Examiner* — Stephanie Bloss
(74) *Attorney, Agent, or Firm* — Birch, Stewart, Kolasch & Birch, LLP

(57) ABSTRACT

A normal detection method for measuring the distance to a measurement subject using one or a plurality of distance detectors, and obtaining a normal vector on the measured surface of the measurement subject from the obtained measurement result, wherein: within a three-dimensional space, the straight line linking a first measurement point measured at a first measurement position using a distance detector and a second measurement point measured at a second measurement position different from the first measurement position is set as a first vector; the straight line linking the first measurement point and a third measurement point measured at a third measurement position different from the first measurement position and the second measurement position as a second vector; and a normal vector on the measured surface is obtained by determining the vector product of the first vector and the second vector.

4 Claims, 5 Drawing Sheets

(51) Int. Cl.
*G01B 21/22* (2006.01)
*G01B 21/04* (2006.01)

(58) Field of Classification Search
USPC .......................................................... 702/158
See application file for complete search history.

(56) References Cited

FOREIGN PATENT DOCUMENTS

| | | |
|---|---|---|
| JP | 4-241603 A | 8/1992 |
| JP | 7-294237 A | 11/1995 |
| JP | 8-71823 A | 3/1996 |
| JP | 2001-99641 A | 4/2001 |
| WO | WO 90/14924 A1 | 12/1990 |
| WO | WO 92/11974 A1 | 7/1992 |

OTHER PUBLICATIONS

Scott Hogan, et al "Automated Wing Drilling System for the A380-GRAWDE"—2003-01-2940—pp. 1-8.
Extended European Search Report dated Nov. 30, 2015 issued in corresponding European Application No. 12868552.6.
Lee, RT et al."Calculation of the unit normal vector using the cross-curve moving mask method for probe radius compensation of a freeform surface measurement" Measurement, Institute of Measurement and Control, vol. 43, No. 4, May 1, 2010, pp. 469-478.
Milroy MJ et al. "G1 continuity of B-spline surface patches in reverse engineering" Computer Aided Design, Elsevier Publishers VB., vol. 27, No. 6, Jun. 1, 1995 pp. 471-478.

\* cited by examiner

NORMAL DETECTION METHOD, NORMAL DETECTION DEVICE, AND MACHINING MACHINE PROVIDED WITH NORMAL DETECTION FUNCTION

TECHNICAL FIELD

The present invention relates to normal detection method using distance detectors, a normal detection device, and a machining machine provided with a normal detection function.

BACKGROUND ART

In machining, it is important to perform machining according to design drawings and according to machining setting. For that purpose, it is required to precisely find out machining positions, machining directions, and machining amounts with respect to workpieces.

For example, in a structure in which a number of component parts are mechanically coupled together by mechanical coupling parts, such as rivets and fasteners, as in an airframe of an aircraft, it is necessary to perform drilling, which allows the mechanical coupling parts to pass through the respective component parts, with precise machining positions, machining directions, and machining amounts.

When a main wing that is one component part of the aircraft, and a skeleton part or the like are mechanically coupled together by a mechanical coupling part or the like, a protrusion may be formed on the surface of the main wing as the mechanical coupling part protrudes from the surface of the main wing, or a recess may be formed in the surface of the main wing as an attachment hole of the mechanical coupling part becomes deep. The protrusion and recess on the surface of the main wing influence the aerodynamic performance of an airplane. Hence, drilling, which allows a mechanical coupling part to pass through the main wing that is a workpiece, is performed with a precise machining position, a precise machining direction, and a precise machining amount so that the protrusion and the recess are minimized. Here, the machining direction is mainly an angle orthogonal to a workpiece, and it is necessary to obtain the normal vector on a surface to be machined.

CITATION LIST

Patent Literature

[PTL 1] Japanese Unexamined Patent Application Publication No. 61-269002
[PTL 2] Japanese Unexamined Patent Application Publication No. 8-71823

SUMMARY OF INVENTION

Technical Problem

PTL 1 discloses a normal detection method that obtains the normal vector on the surface to be machined, and PTL 2 discloses a machining machine provided with a normal detection function.

The normal detection method of PTL 1 is a method of obtaining the normal vector on a measured surface of a measurement subject by two opposed contact sensors among a plurality of contact sensors radially installed on a tip surface of an inner tube at one end coming into contact with the measurement subject and two opposed contact sensors installed on two protruding opposed tip surfaces of the outer tube at one end coming into contact with the measurement subject, in a movable normal detection jig in which the inner tube and the outer tube are coaxially fitted to each other and the outer tube is rotatable in a circumferential direction and movable in an axial direction with respect to the inner tube.

This is a method of determining whether the axial direction of the normal detection jig is the same as the normal vector on the measured surface. That is, the axial direction of the normal detection jig should be sought such that the two opposed contact sensors of the inner tube detect the measurement subject and the two contact sensors installed at the tip of the outer tube detect the measurement subject. Hence, the operation for allowing the axial direction of the normal detection jig to coincide with the normal vector on the measured surface will take a substantial time. Additionally, in the normal detection method of PTL 1, it is difficult to automatically control the posture of the normal detection jig.

The machining machine provided with a normal detection function of PTL 2 is a drilling machine provided with a machining jig in which two non-contact sensors are provided at one end and a motor-driven height adjustment mechanism is provided at the other end. The two non-contact sensors are arranged so as to become symmetrical with respect to the drilling tool, and the height adjustment mechanism is arranged so as to line up with the two non-contact sensors and the machining tool. By performing adjustment using the height adjustment mechanism so that measurement distances obtained by the two non-contact sensors become equal to each other, the angle of the machining machine to the surface to be machined is made right-angled.

This is a device that detects perpendicularity with respect to one direction in which the two non-contact sensors and the height adjustment mechanism are lined up. Hence, since the perpendicularity to a direction different from the one direction cannot be detected, it is insufficient for obtaining the normal vector on the surface to be machined with high precision.

The invention has been made in view of the above problems, and an object thereof is to calculate a normal vector on a measured surface with high precision from measurement distances obtained by distance detectors so that it is not necessary to search for the normal vector on the measured surface.

Solution to Problem

A normal detection method related to a first aspect of the invention to solve the above problems measures a plurality of distances to a measurement subject using one or a plurality of distance detectors, and obtains a normal vector on a measured surface of the measurement subject from the obtained measurement results. A plurality of measurement points on the measured surface at a plurality of measurement positions are represented by three-dimensional coordinates from the plurality of measurement positions where the distance detectors measure the distances to the measurement subject, and a plurality of measurement results obtained by the distance detectors at the plurality of measurement positions, a straight line connecting, on three-dimensional axes, a first measurement point measured at an arbitrary first measurement position among the plurality of measurement positions by the distance detector and a second measurement point measured at a second measurement position different from the first measurement position is defined as a first vector, a straight line connecting, on three-dimensional axes, the first measurement point and a third measurement point measured at a third measurement position different from the first measurement position and the second measurement position is defined as a second vector, and a normal vector on the measured surface is obtained by determining an outer product of the first vector and the second vector.

In the normal detection method according to a second aspect of the invention to solve the above problems, the first measurement position, the second measurement position, and the third measurement position are selected so that the area of a triangle made with three points of the first measurement position, the second measurement position, and the third measurement position becomes the largest.

In the normal detection method according to a third aspect of the invention to solve the above problems, the distance detectors are radially arranged in eight places including the first measurement position, the second measurement position, and the third measurement position.

In the normal detection method according to a fourth aspect of the invention to solve the above problems, non-contact sensors are used as the distance detectors.

A normal detection device related to a fifth aspect of the invention to solve the above problems includes one or a plurality of distance detectors that measure a distance to a measurement subject; and arithmetic means for representing a plurality of measurement points on the measured surface at a plurality of measurement positions by three-dimensional coordinates from the plurality of measurement positions where the distance detectors measure distances to the measurement subject, and a plurality of measurement results obtained by the distance detectors at the plurality of measurement positions, defining, as a first vector, a straight line connecting, on three-dimensional axes, a first measurement point measured at an arbitrary first measurement position among the plurality of measurement positions by the distance detector and a second measurement point measured at a second measurement position different from the first measurement position, defining, as a second vector, a straight line connecting, on three-dimensional axes, the first measurement point and a third measurement point measured at a third measurement position different from the first measurement position and the second measurement position, calculating a normal vector on the measured surface by an outer product of the first vector and the second vector, and calculating a machining vector passing through a setting point of a machining place using the calculated normal vector.

A machining machine provided with a normal detection function according to a sixth aspect of the invention to solve the above problems includes the normal detection device according to the fifth aspect of the invention, and three-dimensional posture control means for three-dimensionally controlling the posture of the normal detection device and a machining tool to be the machining vector calculated by the arithmetic means.

Advantageous Effects of Invention

According to the normal detection method related to the first invention, since the normal vector is calculated from the first vector and the second vector that are not parallel to each other and are different from each other, the normal vector can be obtained with high precision. Additionally, since the normal vector on the measured surface can be calculated from the measurement distances obtained by the distance detectors, when the normal detection method related to the invention is applied to a machining machine or the like, it is easy to automatically control the posture of a machining tool or the like of the machining machine, and it is possible to shorten the working hours, which are taken for controlling the posture of the machining tool or the like of the machining machine so that the machining direction or the like of the machining machine coincides with the normal vector on the measured surface.

According to the normal detection method related to the second invention, the first measurement position, the second measurement position, and the third measurement position are selected so that the area of the triangle made at the three points of the first measurement position, the second measurement position, and the third measurement position becomes the largest, and the first measurement position, the second measurement position, and the third measurement position are spaced apart from each other. Thus, the precision of the normal vector, which is calculated from the measurement distances at the first measurement position, the second measurement position, and the third measurement position obtained by the distance detectors, is improved.

According to the normal detection method related to the third invention, simultaneous measurements are allowed in eight places by using the eight distance detectors that are radially installed. As a result, even when some distance detectors cannot perform effective measurement due to holes, end surfaces, or the like, the normal vector can be obtained from the measurement distances obtained by the other distance detectors that can perform effective measurement.

According to the normal detection method related to the fourth invention, since the operation for bringing contact sensors into contact with a measurement subject is eliminated by using the non-contact sensors as the distance detectors, the working hours for obtaining the normal vector on the measured surface can be shortened.

According to the normal detection device related to the fifth invention, since the normal vector is calculated from the first vector and the second vector that are not parallel and are different, the normal vector can be obtained with high precision. Additionally, since the normal vector on the measured surface can be calculated from the measurement distances obtained by the distance detectors, when the normal detection device related to the invention is applied to a machining machine or the like, it is easy to automatically control the posture of a machining tool or the like of the machining machine, and it is possible to shorten the working hours, which are taken for controlling the posture of the machining tool or the like of the machining machine so that the machining direction or the like of the machining machine coincides with the normal vector on the measured surface.

According to the machining machine provided with a normal detection function related to the sixth invention, the normal vector on the measured surface is calculated by the normal detection device related to the fifth invention, and the posture of the machining tool is controlled in conformity with the calculated normal vector by the three-dimensional posture control means. Thus, the machining tool can be precisely and rapidly made to coincide with the normal vector, and machining in a precise normal direction can be processed.

DESCRIPTION OF EMBODIMENTS

Hereinafter, examples of a normal detection method related to the invention will be described in detail with reference to the attached drawings. Of course, it is obvious that the invention is not limited to the following examples but various changes can be made without departing from the concept of the invention.

Example 1

A normal detection method related to Example 1 of the invention will be described with reference to FIGS. 1 to 8.

In the present example, a machining jig 10 including a normal detection mechanism is attached to a machining machine (not shown) so as to allow machining from a normal direction on a measured surface 21 of a measurement subject 20 that is a workpiece.

Figure 1:
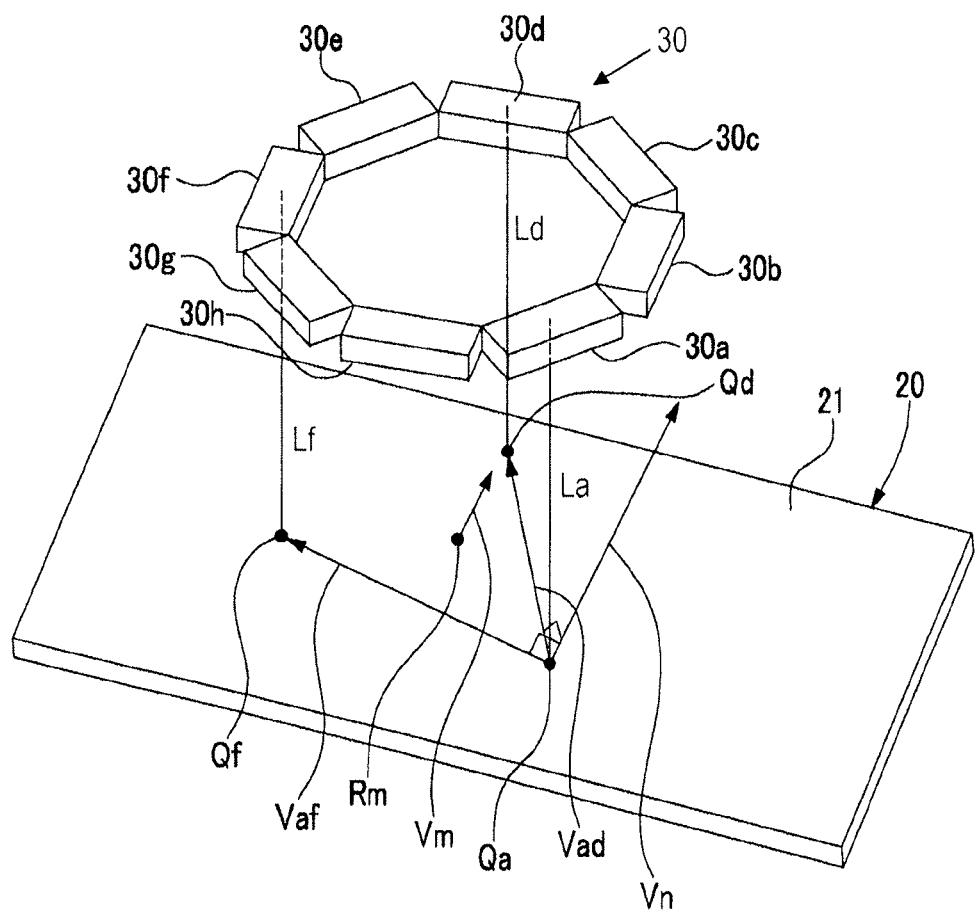
FIG. 1 is a conceptual diagram showing measurement using distance detectors related to Example 1.
Figure 2:
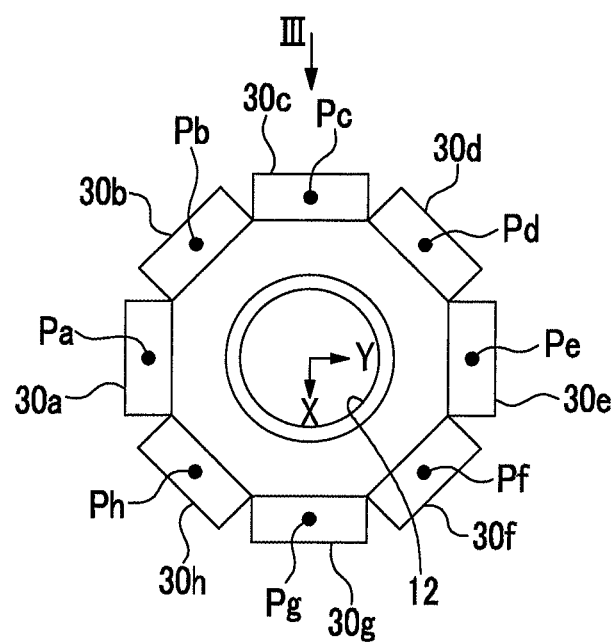
FIG. 2 is a plan view (as seen from a direction of arrow II in FIG. 3) showing the arrangement of the distance detectors in a machining jig related to Example 1.
Figure 3:
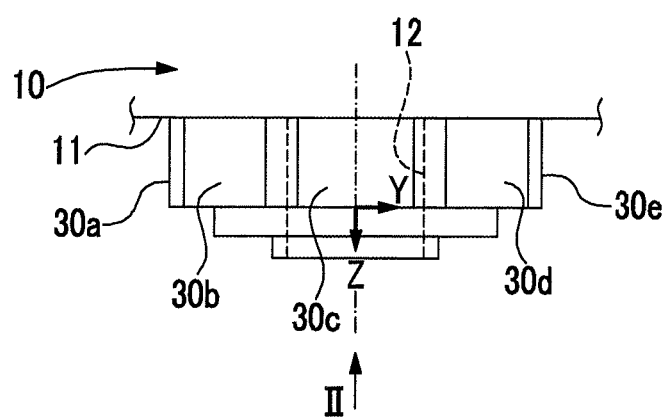
FIG. 3 is a side view as seen from a direction of arrow III of FIG. 2.

As shown in FIGS. 1 and 2, the machining jig 10 includes non-contact sensors 30 that measure a distance to the measurement subject 20, arithmetic means (not shown) for calculating a normal vector Vn and a machining vector Vm on the measured surface 21 from a measurement distance L obtained by the non-contact sensors 30, and three-dimensional posture control means (not shown) for three-dimensionally controlling the posture of the machining jig 10 to be in a direction calculated by the arithmetic means, together with the machining machine (not shown). In the machining jig 10 of the present example, eight non-contact sensors 30a, 30b, 30c, 30d, 30e, 30f, 30g, and 30h are radially installed on a machining-side tip surface 11 of the machining jig 10.

Additionally, the machining jig 10 includes a machining-side tip hole 12 through which a parallel jig 40 (FIGS. 4 and 5) performing Z-direction correction in the non-contact sensors 30a to 30h installed in the machining jig 10 and an inclined jig 50 (FIGS. 6 and 7) that performing X-direction and Y-direction correction in the non-contact sensors 30a to 30h installed in the machining jig 10 are attachable and detachable. Here, the Z direction is a measurement direction of the non-contact sensors 30a to 30h, the X direction is an arbitrary direction orthogonal to the Z direction, and the Y-direction is a direction orthogonal to the Z direction and the X direction. In addition, the machining-side tip hole 12 is also used as a hole that allows a machining part of the machining machine (not shown) to pass therethrough during machining.

Figure 4:
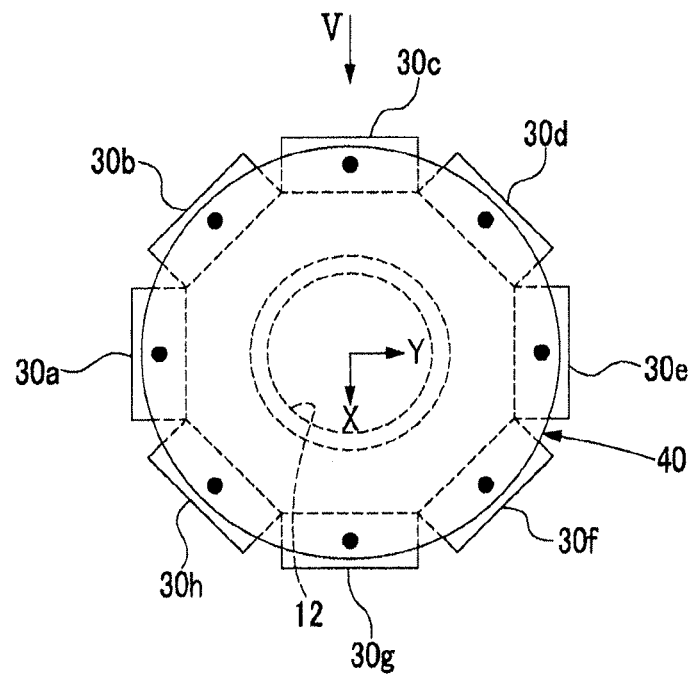
FIG. 4 is a plan view (as seen from a direction of arrow IV in FIG. 5) showing the machining jig related to Example 1 to which a parallel jig is attached.
Figure 5:
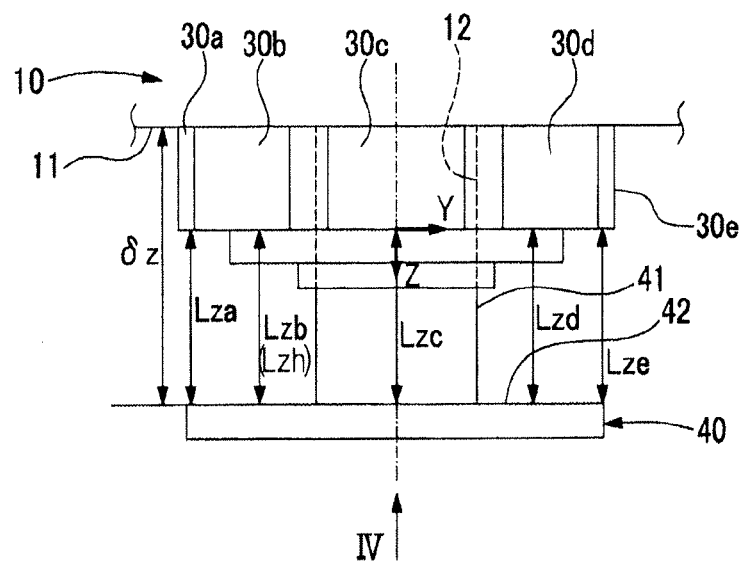
FIG. 5 is a side view as seen from a direction of arrow V of FIG. 4.

The parallel jig 40 is a jig that performs the Z-direction correction in the non-contact sensors 30a to 30h, and as shown in FIGS. 4 and 5, has an attachment cylindrical portion 41 to be fitted to the machining-side tip hole 12 of the machining jig 10, and a Z-direction correction surface 42 that performs the Z-direction correction in the non-contact sensors 30a to 30h. If the attachment cylindrical portion 41 of the parallel jig 40 is inserted into the machining-side tip hole 12 of the machining jig 10 and the parallel jig 40 is fixed to the machining jig 10, the Z-direction correction surface 42 perpendicularly intersects the Z direction that is a direction parallel to the machining-side tip surface 11 of the machining jig 10, that is, the measurement direction of the non-contact sensors 30a to 30h, and is located at an arbitrary distance δz from the machining-side tip surface 11 of the machining jig 10. In addition, since the Z-direction correction in the eight non-contact sensors 30a to 30h is performed, the Z-direction correction surface 42 is broad to such a degree that the eight non-contact sensors 30a to 30h can measure a distance to the Z-direction correction surface 42.

Figure 6:
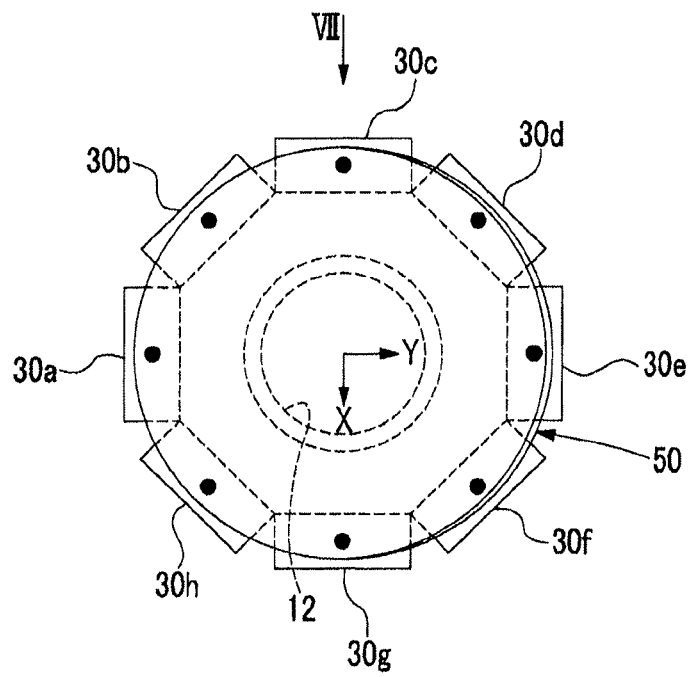
FIG. 6 is a plan view (as seen from a direction of arrow VI in FIG. 7) showing the machining jig related to Example 1 to which an inclined jig is attached.
Figure 7:
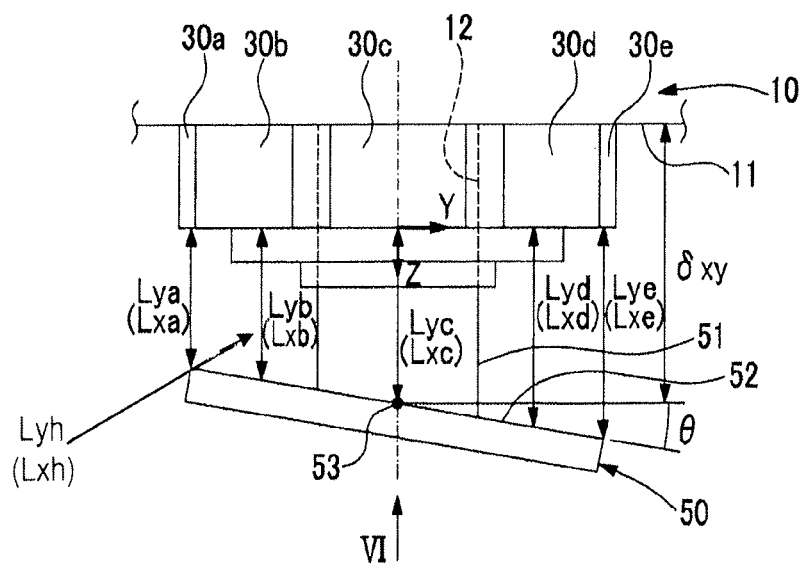
FIG. 7 is a side view as seen from a direction of arrow VII of FIG. 6.

The inclined jig 50 is a jig that performs the X-direction and Y-direction correction in the non-contact sensors 30a to 30h, and as shown in FIGS. 6 and 7, has an attachment cylindrical portion 51 to be fitted to the machining-side tip hole 12 of the machining jig 10, and an XY-direction correction surface 52 that performs the Z-direction correction in the non-contact sensors 30a to 30h. If the attachment cylindrical portion 51 is inserted into the machining-side tip hole 12 and the inclined jig 50 is fixed to the machining jig 10, the XY-direction correction surface 52 forms an arbitrary angle θ with respect to the machining-side tip surface 11 of the machining jig 10, and a central portion 53 of the XY-direction correction surface 52 is located at an arbitrary distance δxy from the machining-side tip surface 11 of the machining jig 10. In addition, since the XY-direction correction in the eight non-contact sensors 30a to 30h is performed, the XY-direction correction surface 52 is broad to such a degree that the eight non-contact sensors 30a to 30h can measure a distance to the XY-direction correction surface 52.

The XY-direction correction surface 52 can be attached so as to be parallel to the X direction by providing a protrusion (not shown) on an outer wall surface of the attachment cylindrical portion 51 of the inclined jig 50, providing a first recess (not shown) in an inner wall surface of the machining-side tip hole 12 of the machining jig 10 and allowing the protrusion of the attachment cylindrical portion 51 of the inclined jig 50 and the first recess of the machining-side tip hole 12 of the machining jig 10 to engage with each other, and the XY-direction correction surface 52 can be attached so as to become parallel to the Y direction by providing a second recess (not shown) at a position rotated by 90° from the first recess in the circumferential direction in the inner wall surface of the machining-side tip hole 12 of the machining jig 10 and by allowing the protrusion of the attachment cylindrical portion 51 of the inclined jig 50 and the second recess of the machining-side tip hole 12 of the machining jig 10 to engage with each other.

First, the Z-direction correction in the non-contact sensors 30*a* to 30*h* installed in the machining jig 10, using the machining jig 10 and the parallel jig 40, will be described with reference to FIG. 5.

The parallel jig 40 is attached to the machining jig 10, and the distance to the Z-direction correction surface 42 of the parallel jig 40 is measured by the eight non-contact sensors 30*a* to 30*h*. The parallel jig 40 and the Z-direction correction surface 42 are formed so that the Z-direction correction surface 42 of the parallel jig 40 has the arbitrary distance $\delta z$ from the machining-side tip surface 11 of the machining jig 10, and are assembled to the machining jig 10. Hence, the Z-direction correction in the eight non-contact sensors 30*a* to 30*h* can be performed by comparison with measurement distances Lza to Lzh to the Z-direction correction surface 42 obtained by the non-contact sensors 30*a* to 30*h*. That is, the installation positions of the eight non-contact sensors 30*a* to 30*h* in the Z direction with respect to the machining jig 10 can be precisely found out, relative errors caused by the assembling or the like of the eight non-contact sensors 30*a* to 30*h* to the machining jig 10 can be corrected for, and Z-direction distance measurement using the non-contact sensors 30*a* to 30*h* can be precisely performed.

Next, the X-direction correction in the non-contact sensors 30*a* to 30*h* installed in the machining jig 10, using the machining jig 10 and the inclined jig 50, will be described with reference to FIG. 7.

The inclined jig 50 is attached to the machining jig 10 so that the XY-direction correction surface 52 becomes parallel to the Y direction, and the distance to the XY-direction correction surface 52 of the inclined jig 50 is measured by the eight non-contact sensors 30*a* to 30*h*. The inclined jig 50 and the XY-direction correction surface 52 are formed so that the XY-direction correction surface 52 has the arbitrary angle $\theta$ with respect to the machining-side tip surface 11 of the machining jig 10 and the central portion of the XY-direction correction surface has the arbitrary distance $\delta xy$ from the machining-side tip surface 11 of the machining jig 10, and are assembled to the machining jig 10. Hence, the X-direction correction in the eight non-contact sensors 30*a* to 30*h* can be performed by calculation from measurement distances Lxa to Lxh obtained by the non-contact sensors 30*a* to 30*h*. That is, the installation positions Xa to Xh of the eight non-contact sensors 30*a* to 30*h* in the X direction with respect to the machining jig 10 can be precisely found out, relative errors caused by the assembling or the like of the eight non-contact sensors 30*a* to 30*h* to the machining jig 10 can be corrected for, and X-direction distance measurement using the non-contact sensors 30*a* to 30*h* can be precisely performed.

Next, the Y-direction correction in the non-contact sensors 30*a* to 30*h* installed in the machining jig 10, using the machining jig 10 and the inclined jig 50, will be described with reference to FIG. 7.

The inclined jig 50 is attached to the machining jig 10 so that the XY-direction correction surface 52 becomes parallel to the X direction, and the distance to the XY-direction correction surface 52 of the inclined jig 50 is measured by the eight non-contact sensors 30*a* to 30*h*. The inclined jig 50 is formed so that the XY-direction correction surface 52 has the arbitrary angle $\theta$ and the central portion of the XY-direction correction surface has the arbitrary distance xy from the machining-side tip surface 11 of the machining jig 10, and is assembled to the machining jig 10. Hence, the Y-direction correction in the eight non-contact sensors 30*a* to 30*h* can be performed by calculation from measurement distances Lya to Lyh obtained by the non-contact sensors 30*a* to 30*h*. That is, the installation positions Ya to Yh of the eight non-contact sensors 30*a* to 30*h* in the Y direction with respect to the machining jig 10 can be precisely found out, relative errors caused by the assembling or the like of the eight non-contact sensors 30*a* to 30*h* to the machining jig 10 can be corrected for, and Y-direction distance measurement using the non-contact sensors 30*a* to 30*h* can be precisely performed.

Next, the normal detection method of obtaining the normal vector Vn on the measured surface 21, using the machining jig 10, will be described with reference to FIG. 1.

The normal vector Vn is obtained by selecting three non-contact sensors from the eight non-contact sensors 30*a* to 30*h* installed in the machining jig 10, and performing calculation from measurement distances La, Ld, and Lf obtained by non-contact sensors 30*a*, 30*d*, and 30*f* of a selected combination to be described below, and installation positions (a first measurement position, a second measurement position, and a third measurement position) Pa (Xa, Ya), Pd (Xd, Yd), and Pf (Xf, Yf) of the non-contact sensors 30*a*, 30*d*, and 30*f* of the selected combination.

Measurement distances La to Lh to the measurement subject 20 is measured using the eight non-contact sensors 30*a* to 30*h* installed in the machining jig 10. In the eight non-contact sensors 30*a* to 30*h* installed in the machining jig 10, the number of combinations of selecting three non-contact sensors is fifty six ways, and is five ways if being classified according to the areas of triangles made by the respective combinations.

Figure 8A:
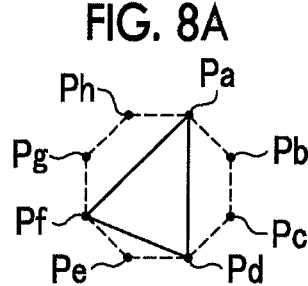
FIG. 8A is a schematic view showing an example of the selection of forming a triangle with a largest area, in the arrangement of the distance detectors in the machining jig related to Example 1.
Figure 8B:
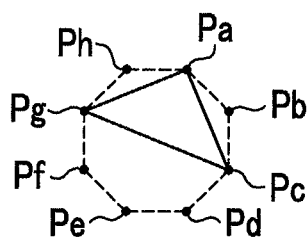
FIG. 8B is a schematic view showing an example of the selection of forming a triangle with a second largest area, in the arrangement of the distance detectors in the machining jig related to Example 1.
Figure 8C:
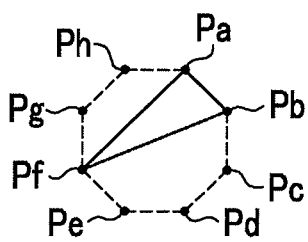
FIG. 8C is a schematic view showing an example of the selection of forming a triangle with a third largest area, in the arrangement of the distance detectors in the machining jig related to Example 1.
Figure 8D:
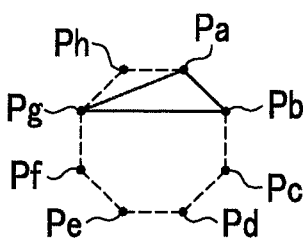
FIG. 8D is a schematic view showing an example of the selection of forming a triangle with a fourth largest area, in the arrangement of the distance detectors in the machining jig related to Example 1.
Figure 8E:
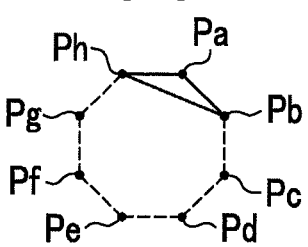
FIG. 8E is a schematic view showing an example of the selection of forming a triangle with a fifth largest area, in the arrangement of the distance detectors in the machining jig related to Example 1.

For example, the number of combinations of obtaining triangles with a largest area (as shown in FIG. 8A where, for example, measurement positions Pa, Pd, and Pf are selected) is eight ways of selecting the non-contact sensors 30*a*, 30*d*, and 30*f*, or the like, the number of combination of obtaining triangles with a second largest area (as shown in FIG. 8B where, for example, measurement positions Pa, Pc, and Pg are selected) is eight ways of selecting the non-contact sensors 30*a*, 30*c*, and 30*g*, or the like, the number of combinations of obtaining triangles with a third largest area (as shown in FIG. 8C where, for example, measurement positions Pa, Pb, and Pf are selected) is sixteen ways of selecting the non-contact sensors 30*a*, 30*b*, and 30*f*, or the like, the number of combinations of obtaining triangles with a fourth largest area (as shown in FIG. 8D where, for example, measurement positions Pa, Pb, and Pg are selected) is sixteen ways of selecting the non-contact sensors 30*a*, 30*b*, and 30*g*, or the like, and the number of combinations of obtaining triangles with a smallest area (as shown in FIG. 8E where, for example, measurement positions Pa, Pb, and Ph are selected) is eight ways of selecting the non-contact sensors 30*a*, 30*b*, and 30*h*, or the like.

All the measurement distances La to Lh to the measurement subject 20 measured by the eight non-contact sensors 30*a* to 30*h* are not necessarily effective. That is, a hole is made at measurement points Qa to Qh of the measurement subject 20 or the measurement points Qa to Qh deviate from an end portion of the measurement subject 20. However, the measurement distances La to Lh that are measurement results by all the non-contact sensors 30*a* to 30*h* are not necessarily obtained, and it is sufficient if a required number of effective measurement distances La to Lh are valid. When a required number of effective measurement distances La to Lh are not value, the required number of effective measurement distances La to Lh are valid by slightly translating the machining jig 10 and performing measurement using the non-contact sensors 30a to 30h.

The non-contact sensors 30a to 30h to be used for the calculation of the normal detection are selected so that the area made by three non-contact sensors 30 selected from the non-contact sensors 30a to 30h by which the measurement distances La to Lh that are effective measurement results are obtained becomes the largest.

Measurement points (a first measurement point, a second measurement point, and a third measurement point) Qa, Qd, and Qf on the measured surface 21 to be measured by the non-contact sensors 30a, 30d, and 30f of the selected combination are represented by three-dimensional coordinates from the installation positions Pa (Xa, Ya), Pd (Xd, Yd), and Pf (Xf, Yf) of the non-contact sensors 30a, 30d, and 30f in XY directions, and the measurement distances La, Ld, and Lf obtained by the non-contact sensors 30a, 30d, and 30f.

Measurement point Qa: (Xa, Ya, Za)

Measurement point Qd: (Xd, Yd, Zd)

Measurement point Qf: (Xf, Yf, Zf)

A vector (first vector) Vad connecting the measurement point Qa and the measurement point Qd measured by two arbitrary non-contact sensors 30a and 30d among the non-contact sensors 30a, 30d, and 30f of the selected combination, and a vector (second vector) Vaf connecting the measurement point Qa and measurement point Qf measured by two arbitrary non-contact sensors 30a and 30f among the non-contact sensors 30a, 30d, and 30f of the selected combination are calculated on the basis of the three-dimensional coordinates.

$$Vad = s \begin{pmatrix} Xd - Xa \\ Yd - Ya \\ Zd - Za \end{pmatrix} + \begin{pmatrix} Xa \\ Ya \\ Za \end{pmatrix} \quad \text{[Formula 1]}$$

$$Vaf = t \begin{pmatrix} Xf - Xa \\ Yf - Ya \\ Zf - Za \end{pmatrix} + \begin{pmatrix} Xa \\ Ya \\ Za \end{pmatrix}$$

Here, s and t are arbitrary real numbers.

The vector Vn that is an outer product of the vector Vad and the vector Vaf is calculated. The vector Vn is a direction vector orthogonal to the vector Vad and the vector Vaf, and represents a normal vector on the measured surface 21.

$$Vn = Vaf \times Vad \quad \text{[Formula 2]}$$
$$= u \begin{pmatrix} (Yf - Ya)(Zd - Za) - (Yd - Ya)(Zf - Za) \\ (Zf - Za)(Xd - Xa) - (Zd - Za)(Xf - Xa) \\ (Xf - Xa)(Yd - Ya) - (Xd - Xa)(Yf - Ya) \end{pmatrix} + \begin{pmatrix} Xa \\ Ya \\ Za \end{pmatrix}$$

Here, u is an arbitrary real number.

The machining vector Vm passing through a set point Rm (Xm, Ym, Zm) of a machining place is calculated from the calculated normal vector Vn.

$$Vm = v \begin{pmatrix} (Yf - Ya)(Zd - Za) - (Yd - Ya)(Zf - Za) \\ (Zf - Za)(Xd - Xa) - (Zd - Za)(Xf - Xa) \\ (Xf - Xa)(Yd - Ya) - (Xd - Xa)(Yf - Ya) \end{pmatrix} + \begin{pmatrix} Xm \\ Ym \\ Zm \end{pmatrix} \quad \text{[Formula 3]}$$

Here, v is an arbitrary real number.

The posture of the machining jig 10 is controlled by three-dimensional posture control means so that the central axis of the machining jig 10 coincides with the obtained machining vector Vm. At this time, the measurement distances La, Ld, and Lf obtained by the opposed non-contact sensors 30a, 30d, and 30f become the same value.

By virtue of the above-described normal detection method and three-dimensional posture control, the normal vector Vn on the measured surface 21 can be obtained with high precision, the orientation of the machining jig 10 and the orientation of a machining tool of the machining machine (not shown) can be made to coincide with the calculated normal vector Vn, and machining in a precise normal direction can be performed.

Additionally, the normal vector Vn on the measured surface 21 can also be obtained with higher precision not only by calculating the normal vector Vn from the measurement distances La, Ld, and Lf obtained by the non-contact sensors 30a, 30d, and 30f of the selected combination and the installation positions Pa (Xa, Ya), Pd (Xd, Yd), and Pf (Xf, Yf) of the non-contact sensors 30a, 30d, and 30f of the selected combination, but also, for example, by calculating a normal vector V'n from the measurement distances Lb, Le, and Lg obtained by the non-contact sensors 30b, 30e, and 30g and the installation positions Pb (Xb, Yb), Pe (Xe, Ye), and Pg (Xg, Yg) of the non-contact sensors 30b, 30e, and 30g of the selected combination, and taking the average of the plurality of normal vectors Vn and V'n.

In addition, by repeating the operation of the normal detection method and three-dimensional posture control of the present example, the normal vector Vn on the measured surface 21 can be obtained with higher precision, and the machining jig 10 and the machining tool of the machining machine (not shown) can be made to coincide with the normal vector Vn that is calculated with higher precision.

Since the normal detection is influenced by the measurement distances La to Lh obtained by the non-contact sensors 30a to 30h, precise measurement using the non-contact sensors 30a to 30h is required. Hence, in the present example, the X-direction, Y-direction, and Z-direction corrections of the eight non-contact sensors 30a to 30h attached to the machining jig 10 are performed. Of course, if precise measurement and installation using the non-contact sensors 30 are allowed in advance, the X-direction, Y-direction, and Z-direction corrections as in the present example are unnecessary.

In the present example, the eight non-contact sensors 30a to 30h are radially installed as distance detectors to perform the normal detection, but the invention is not limited to this. For example, by making the non-contact sensors 30 movable, the normal vector Vn may be calculated from a plurality of measurement results measured at a plurality of measurement positions by one non-contact sensor 30 or the normal vector Vn may be calculated from measurement results using contact sensors as the distance detectors.

Additionally, in the present example, the normal vector Vn is obtained using the machining jig 10 including the normal detection mechanism, but the invention is not limited to this. For example, the normal detection may be performed without using the machining jig 10 by providing the machining machine with the distance detectors, the arithmetic means, and the three-dimensional posture control means.

INDUSTRIAL APPLICABILITY

The normal detection method related to the invention can detect a normal vector on a target surface in a short time with high precision, and is very useful for the drilling that performs drilling in an aircraft main wing or the like.

REFERENCE SIGNS LIST

10: MACHINING JIG
11: MACHINING-SIDE TIP SURFACE
12: MACHINING-SIDE TIP HOLE
20: MEASUREMENT SUBJECT
21: MEASURED SURFACE
30: NON-CONTACT SENSOR
40: PARALLEL JIG
41: ATTACHMENT CYLINDRICAL PORTION
42: Z-DIRECTION CORRECTION SURFACE
50: INCLINED JIG
51: ATTACHMENT CYLINDRICAL PORTION
52: XY-DIRECTION CORRECTION SURFACE
53: CENTRAL PORTION

The invention claimed is:

1. A normal detection method for measuring a plurality of distances to a measurement subject using one or a plurality of distance detectors, and obtaining a normal vector on a measured surface of the measurement subject from the obtained measurement results, the method comprising:
representing four or more measurement points on the measured surface at four or more measurement positions with three-dimensional coordinates from the four or more measurement positions where the one or the plurality of distance detectors measures the distances to the measurement subject, and four or more measurement results obtained by the one or the plurality of distance detectors at the four or more measurement positions;
defining, as a first vector, a straight line connecting, on three-dimensional axes, a first measurement point measured at an arbitrary first measurement position among the four or more measurement positions by a distance detector and a second measurement point measured at a second measurement position different from the first measurement position;
defining, as a second vector, a straight line connecting, on three-dimensional axes, the first measurement point and a third measurement point measured at a third measurement position different from the first measurement position and the second measurement position;
obtaining a normal vector on the measured surface by determining an outer product of the first vector and the second vector;
calculating a machining vector based on the obtained normal vector; and
controlling position of a machining jig so that a central axis of the machining jig coincides with the calculated machining vector,
wherein the first measurement position, the second measurement position, and the third measurement position are selected so that the area of a triangle made with three points of the first measurement position, the second measurement position, and the third measurement position becomes the largest among areas of triangles made with combinations of other three points of measurement positions.

2. The normal detection method according to claim 1, wherein the one or the plurality of distance detectors is radially arranged in eight places including the first measurement position, the second measurement position, and the third measurement position.

3. The normal detection method according to claim 1, wherein non-contact sensors are used as the one or the plurality of distance detectors.

4. The normal detection method according to claim 2, wherein non-contact sensors are used as the one or the plurality of distance detectors.

* * * * *